(12) United States Patent
Matsuda (10) Patent No.: US 10,986,409 B2
(45) Date of Patent: Apr. 20, 2021

(54) ELECTRONIC APPARATUS ENABLING A USER TO RECOGNIZE GRADATION OF A RAW IMAGE WITH HIGH ACCURACY BY CHECKING THE DISPLAYED RAW HISTOGRAM

(71) Applicant: CANON KABUSHIKI KAISHA, Tokyo (JP)

(72) Inventor: Araki Matsuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/272,342

(22) Filed: Feb. 11, 2019

(65) Prior Publication Data

US 2019/0273886 A1 Sep. 5, 2019

(30) Foreign Application Priority Data

Mar. 2, 2018 (JP) .............................. JP2018-037174

(51) Int. Cl.
*H04N 21/47* (2011.01)
*H04N 5/232* (2006.01)
*G06T 5/40* (2006.01)
*H04N 21/431* (2011.01)

(52) U.S. Cl.
CPC .............. *H04N 21/47* (2013.01); *G06T 5/40* (2013.01); *H04N 5/23225* (2013.01); *H04N 21/4316* (2013.01)

(58) Field of Classification Search
CPC ........... H04N 5/44591; H04N 5/23225; H04N 21/47; H04N 21/4316; G06T 5/40
See application file for complete search history.

(56) References Cited

U.S. PATENT DOCUMENTS

| | | | |
|---|---|---|---|
| 2006/0176400 A1* | 8/2006 | Shimizu | H04N 1/56 348/570 |
| 2011/0267542 A1* | 11/2011 | Tada | H04N 5/202 348/672 |
| 2015/0243050 A1* | 8/2015 | Kaneko | G06K 9/40 382/165 |
| 2016/0196640 A1* | 7/2016 | Kino | H04N 1/6027 348/234 |

FOREIGN PATENT DOCUMENTS

| | | |
|---|---|---|
| CN | 101646014 A | 2/2010 |
| CN | 101996045 A | 3/2011 |
| CN | 105389593 A | 3/2016 |
| JP | 2005-80049 A | 3/2005 |

\* cited by examiner

*Primary Examiner* — Luong T Nguyen
(74) *Attorney, Agent, or Firm* — Canon U.S.A., Inc. IP Division (57) ABSTRACT

There is provided a technology for enabling a user to recognize gradation of a captured image with high accuracy, when the user checks a substitute image displayed in substitution for the captured image. An electronic apparatus divides a captured image into a plurality of partial areas, generates each of histograms for the respective partial areas, the histograms each representing a number of pixels of each gradation, and outputs the generated histogram to an apparatus that displays a substitute image having a data size smaller than a data size of the captured image.

7 Claims, 6 Drawing Sheets

ELECTRONIC APPARATUS ENABLING A USER TO RECOGNIZE GRADATION OF A RAW IMAGE WITH HIGH ACCURACY BY CHECKING THE DISPLAYED RAW HISTOGRAM

BACKGROUND

Field of the Disclosure

The present disclosure generally relates to an electronic apparatus that can present an output to outside or execute display control of a substitute image that substitutes for a captured image.

Description of the Related Art

There is an image capturing apparatus that has a wireless communication function in conformity with a Wireless Fidelity (Wi-Fi) standard. This image capturing apparatus can wirelessly transmit a captured image which is recorded in a memory card or built-in memory to an external apparatus such as a smartphone, and store the transmitted image. In general, a RAW image has a data size (an information amount) which is relatively larger than the data size of an image in a general-purpose image format such as Joint Photographic Experts Group (JPEG). Therefore, in a case where an image to be transmitted is a RAW image, the RAW image itself may not be transmitted and a JPEG image substituting for the RAW image may be transmitted. In this case, a reduction in transmission time and battery saving in an external apparatus can be expected. For example, Japanese Patent Application Laid-Open No. 2005-80049 discusses a technology for converting the image format of a captured image and transmitting the image after the conversion.

In general, information about color and color tone captured by an image sensor (an image capturing element) of an image capturing apparatus is recorded in a RAW image as much as possible, and the color depth of a JPEG image is lower than the color depth of the RAW image. Therefore, if the RAW image is converted into the JPEG image, the color depth may be reduced. As a result, gradation collapse (whiteout or blackout) not present in the RAW image can occur in the JPEG image. Even if a user can visually recognize the JPEG image displayed in substitution for the RAW image, the user cannot recognize the gradation of the RAW image with high accuracy. For example, the user cannot determine whether whiteout or blackout occurring in the JPEG image is also present in the RAW image.

SUMMARY

The present disclosure is related to a technology for enabling a user to recognize gradation of a captured image with high accuracy when the user checks a substitute image displayed in substitution for the captured image.

According to a first aspect of the present disclosure, an electronic apparatus includes an acquisition unit configured to acquire a histogram from a captured image, the histogram having gradation values in a partial area that is an area forming a part of the captured image, and an output unit configured to output the histogram, area information about the partial area, and a substitute image that has a data size smaller than a data size of the captured image and substitutes for the captured image, to outside.

According to a second aspect of the present disclosure, an electronic apparatus includes an acquisition unit configured to acquire a histogram from a captured image, the histogram having gradation values in a partial area that is an area forming a part of the captured image, and a control unit configured to perform control for displaying a substitute image that has a data size smaller than a data size of the captured image and substitutes for the captured image, in such a manner that a correspondence area of the substitute image and corresponding to the partial area is distinguishable, wherein the control unit performs control for displaying the histogram in a case where the correspondence area is designated by a user.

According to a third aspect of the present disclosure, a control method for an electronic apparatus includes acquiring a histogram from a captured image, the histogram having gradation values in a partial area that is an area forming a part of the captured image, and outputting the histogram, area information about the partial area, and a substitute image that has a data size smaller than a data size of the captured image and substitutes for the captured image, to outside.

According to a fourth aspect of the present disclosure, a control method for an electronic apparatus includes acquiring a histogram from a captured image, the histogram having gradation values in a partial area that is an area forming a part of the captured image, and performing control for displaying a substitute image that has a data size smaller than a data size of the captured image and substitutes for the captured image, in such a manner that a correspondence area of the substitute image and corresponding to the partial area is distinguishable, wherein the control is performed to display the histogram in a case where the correspondence area is designated by a user.

According to a fifth aspect of the present disclosure, a computer readable storage medium stores a program that causes a computer to function as each of the units in the above-described electronic apparatuses.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described in detail below with reference to the drawings.

An exemplary embodiment of the present disclosure will be described below. In the present exemplary embodiment, a Joint Photographic Experts Group (JPEG) image (a substitute image, or a substitute JPEG image) that substitutes for a RAW image (a captured image) can be displayed. Further, a RAW histogram of a partial area that forms a part of the RAW image can also be displayed. The RAW histogram is a histogram that represents the number of pixels for RAW gradation values (the gradation of the brightness of the RAW image) in the partial area. The user can thereby check not only the substitute JPEG image but also the RAW histogram. As a result, the user can recognize the gradation of the RAW image with high accuracy by checking the displayed RAW histogram. Further, the user can determine whether gradation collapse (whiteout or blackout) occurring in the substitute JPEG image is also present in the RAW image by checking the substitute JPEG image and the RAW histogram that are displayed. The captured image is not limited to the RAW image, and the substitute image is not limited to the JPEG image.

In the present exemplary embodiment, an example of a display control system that has an image capturing apparatus serving as a first electronic apparatus, and a display control apparatus serving as a second electronic apparatus, will be described. The image capturing apparatus may be any type of apparatus if the apparatus can perform image capturing (image sensing). Examples of the image capturing apparatus include a digital camera and various mobile terminals (such as a smartphone, a tablet terminal, and a laptop computer). The display control apparatus may be any type of apparatus if the apparatus can control display. Examples of the display control apparatus include various mobile terminals, a personal computer, various reproduction apparatuses, and a server.

Figure 1:
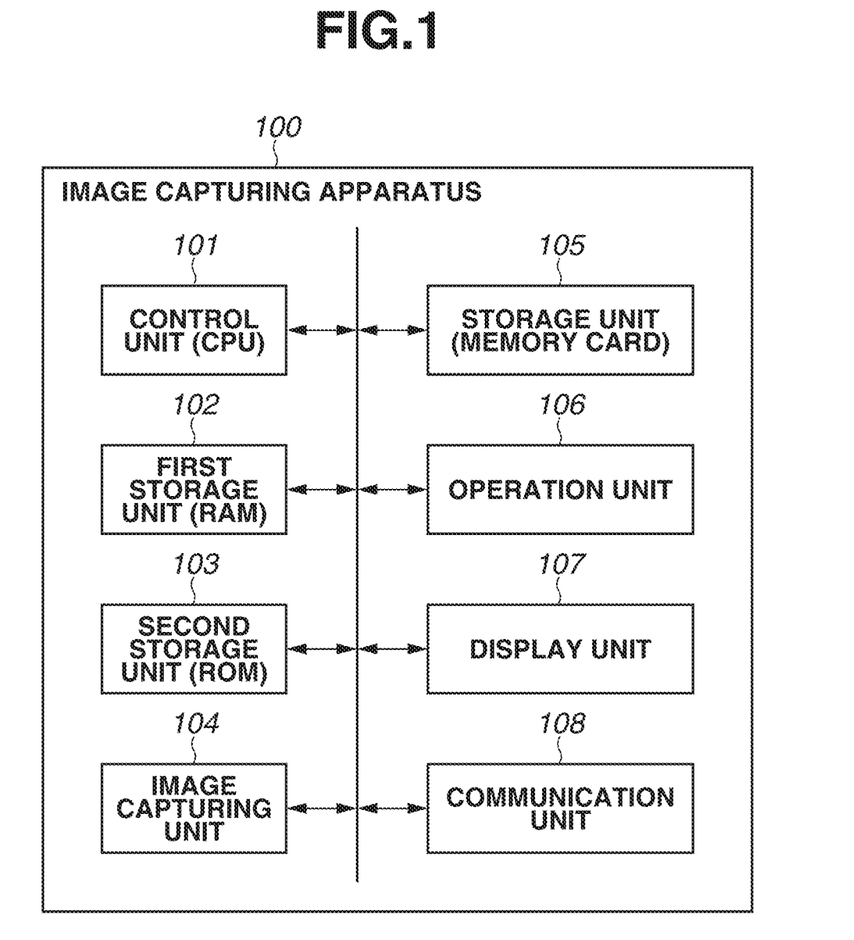
FIG. 1 is a block diagram illustrating a configuration example of an image capturing apparatus according to an exemplary embodiment.

FIG. 1 is a block diagram illustrating a configuration example of an image capturing apparatus 100 according to the present exemplary embodiment. The image capturing apparatus 100 has a control unit 101, a first storage unit 102, a second storage unit 103, an image capturing unit 104, a storage unit 105, an operation unit 106, a display unit 107, and a communication unit 108.

The control unit 101, which may include one or more processors, one or more memories, circuitry, or a combination thereof, may control various kinds of processing performed by the image capturing apparatus 100. For example, a central processing unit (CPU) can be used for the control unit 101. One piece of hardware may be used or a plurality of pieces of hardware may be used for the control unit 101. The processing by the image capturing apparatus 100 may be controlled based on the shared execution of the processing by the plurality of pieces of hardware.

The first storage unit 102 is a unit that temporarily stores various kinds of data, and is used for processing by the control unit 101. For example, a volatile memory (such as a random access memory (RAM)) can be used for the first storage unit 102.

The second storage unit 103 is a unit that non-temporarily stores various kinds of data. The second storage unit 103 stores, for example, various kinds of program (including firmware) to be used by the image capturing apparatus 100 (such as the control unit 101), and various kinds of setting information. For example, a nonvolatile memory (such as a read only memory (ROM)) can be used for the second storage unit 103.

The image capturing unit 104 generates a RAW image (RAW image data) by performing image capturing. The image capturing unit 104 has a lens, a shutter, an iris diaphragm, and an image capturing element (a complementary metal-oxide-semiconductor (CMOS) or a charge-coupled device (CCD)).

The storage unit 105 is a unit that non-temporarily stores various kinds of data. The storage unit 105 stores, for example, a RAW image, and a RAW file including the RAW image. For example, a semiconductor memory (a memory card), a magnetic disk (a hard disk), or an optical disc (a compact disc (CD), a digital versatile disc (DVD), or a Blu-ray disc) can be used for the storage unit 105. A card-type medium such as a magnetic card, an optical card, or an integrated circuit (IC) card can be also used for the storage unit 105. The storage unit 105 may be or may not be detachably attached to the image capturing apparatus 100. The image capturing apparatus 100 only needs to have a function of reading data from and writing data into the storage unit 105 and deleting data stored in the storage unit 105 by accessing the storage unit 105.

The operation unit 106 receives a user operation for the image capturing apparatus 100. The operation unit 106 outputs an operation signal based on the user operation to the control unit 101. The control unit 101 performs processing based on the operation signal. For example, an input device such as a physical button, a pointing device (such as a touch panel, a touchpad, or a mouse), or a keyboard can be used for the operation unit 106. The operation unit 106 may be or may not be detachably attached to the image capturing apparatus 100. The image capturing apparatus 100 only needs to have a function of receiving an electrical signal based on a user operation performed using the input device.

The display unit 107 displays various images. For example, the display unit 107 displays a RAW image, a substitute JPEG image, and a graphic image (such as a character and an icon) for an interactive operation. For example, a liquid crystal panel and a backlight module, or an organic electroluminescence (EL) panel can be used for the display unit 107. The display unit 107 may be or may not be detachably attached to the image capturing apparatus 100. The image capturing apparatus 100 only needs to have a function of controlling the display by the display unit 107.

The communication unit 108 transmits data (such as a control command and image data) to an external apparatus provided outside the image capturing apparatus 100, and receives data from the external apparatus. In the present exemplary embodiment, the communication unit 108 wirelessly transmits data to a display control apparatus (a display apparatus) 200 illustrated in FIG. 2 and wirelessly receives data from the display control apparatus 200 (wireless communication). Examples of the wireless communication include wireless communication in conformity with a standard such as Wireless Fidelity (Wi-Fi) or Bluetooth. The communication between the image capturing apparatus 100 and the display control apparatus 200 may be wired communication using a cable such as a Universal Serial Bus (USB) cable. The communication between the image capturing apparatus 100 and the display control apparatus 200 may be communication via a network such as the Internet and a server, or may be communication without the intervention of these.

Figure 2:
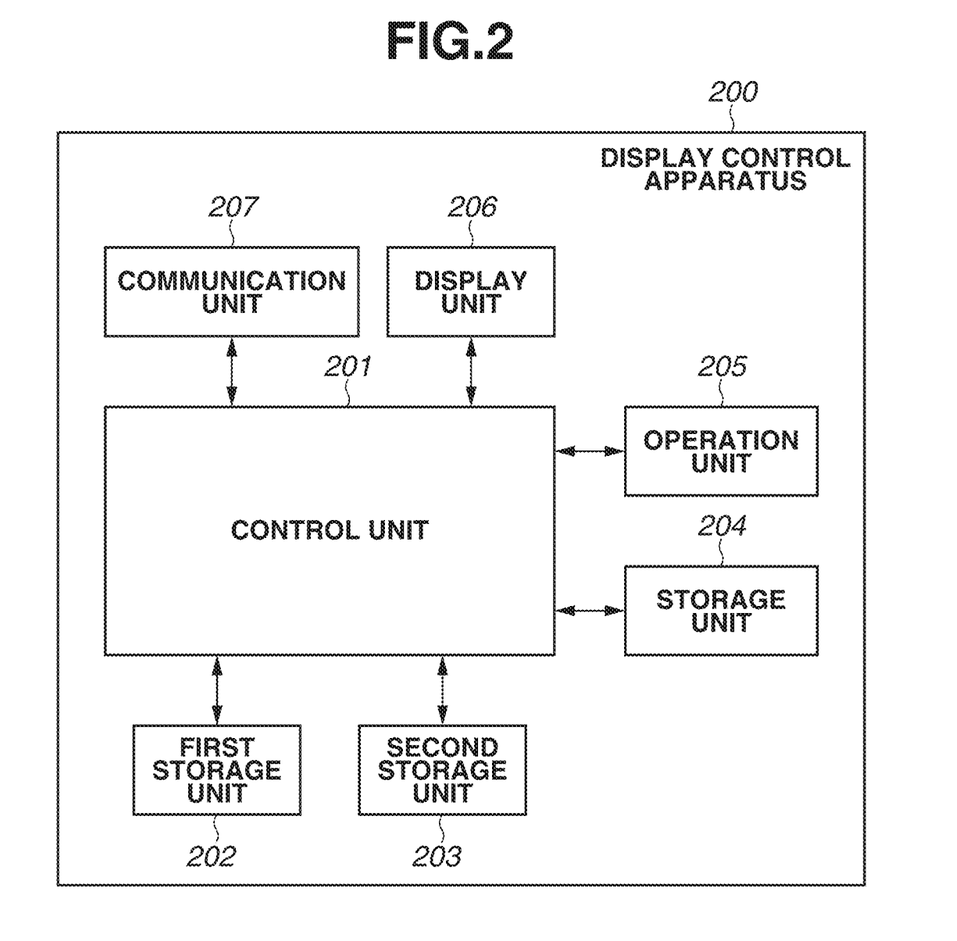
FIG. 2 is a block diagram illustrating a configuration example of a display control apparatus according to the present exemplary embodiment.

FIG. 2 is a block diagram illustrating a configuration example of the display control apparatus 200. The display control apparatus 200 has a control unit 201, a first storage unit 202, a second storage unit 203, a storage unit 204, an operation unit 205, a display unit 206, and a communication unit 207.

The control unit 201, which may include one or more processors, one or more memories, circuitry, or a combination thereof, may control various kinds of processing by the display control apparatus 200. For example, a CPU can be used for the control unit 201. One piece of hardware may be used or a plurality of pieces of hardware may be used for the control unit 201. The processing by the display control apparatus 200 may be controlled based on the shared execution of the processing by the plurality of pieces of hardware.

The first storage unit 202 is a storage unit that temporarily stores various kinds of data, and is used for processing (work) by the control unit 201. For example, a volatile memory (such as a RAM) can be used for the first storage unit 202.

The second storage unit 203 is a storage unit that non-temporarily stores various kinds of data. The second storage unit 203 stores, for example, various kinds of program (including firmware) to be used by the display control apparatus 200 (such as the control unit 201), and various kinds of setting information. For example, a nonvolatile memory (such as a ROM) can be used for the second storage unit 203.

The storage unit 204 is a storage unit that non-temporarily stores various kinds of data. The storage unit 204 stores, for example, data received from the image capturing apparatus 100 (the communication unit 108). For example, a semiconductor memory, a magnetic disk, an optical disc, a magnetic card, an optical card, or an IC card can be used for the storage unit 204. The storage unit 204 may be or may not be detachably attached to the display control apparatus 200. The display control apparatus 200 only needs to have a function of reading data from and writing data into the storage unit 204 and deleting data stored in the storage unit 204 by accessing the storage unit 204.

The operation unit 205 receives a user operation for the display control apparatus 200. The operation unit 205 outputs an operation signal based on the user operation to the control unit 201. The control unit 201 performs processing based on the operation signal. For example, an input device such as a physical button, a pointing device, or a keyboard can be used for the operation unit 205. The operation unit 205 may be or may not be detachably attached to the display control apparatus 200. The display control apparatus 200 only needs to have a function of receiving an electrical signal based on a user operation performed using the input device.

The display unit 206 displays various images. The display unit 206 displays, for example, data received from the image capturing apparatus 100, and a graphic image for an interactive operation. For example, a liquid crystal panel and a backlight module, or an organic EL panel can be used for the display unit 206. The display unit 206 may be or may not be detachably attached to the display control apparatus 200. The display control apparatus 200 only needs to have a function of controlling the display by the display unit 206.

The communication unit 207 transmits data (such as a control command and image data) to an external apparatus provided outside the display control apparatus 200, and receives data from the external apparatus. In the present exemplary embodiment, the communication unit 207 wirelessly transmits data to the image capturing apparatus 100 (the communication unit 108) and wirelessly receives data from the image capturing apparatus 100.

Figure 3:
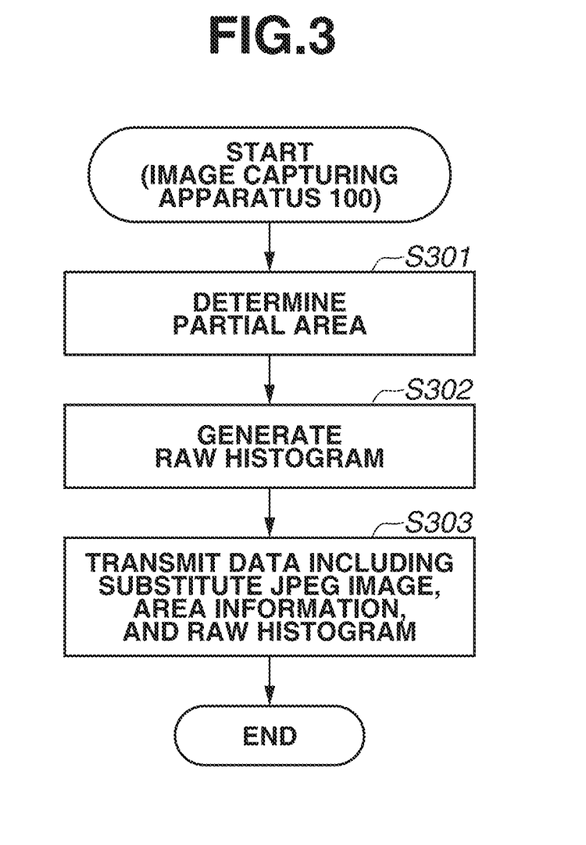
FIG. 3 is a flowchart illustrating an example of a processing flow in the image capturing apparatus according to the present exemplary embodiment.

FIG. 3 is a flowchart illustrating an example of a processing flow in the image capturing apparatus 100. The processing flow in FIG. 3 starts, for example, in response to a user operation for providing an instruction for transmission or display of a substitute JPEG image. The processing flow in FIG. 3 may be performed such that a substitute JPEG image corresponding to a RAW image generated by image capturing is output from the image capturing apparatus 100 to the display control apparatus 200 based on this image capturing.

In step S301, the control unit 101 determines a partial area that is an area forming a part of the RAW image that is a processing target (a target RAW image). In the present exemplary embodiment, the control unit 101 determines four partial areas in two rows and two columns that form the entire area of the target RAW image. Any number, layout, and shape of the plurality of partial areas forming the entire area of the target RAW image may be employed. The entire area of the target RAW image may not be formed by the plurality of partial areas. A plurality of partial areas away from each other may be determined.

In step S302, for each of the partial areas, the control unit 101 generates (acquires) a RAW histogram of the partial area (a histogram of gradation values of the target RAW image) from the target RAW image.

In step S303, the control unit 101 controls the communication unit 108 to transmit (output) the following data (information) to outside. The communication unit 108 thereby transmits the following data to the display control apparatus 200 (the communication unit 207).

Substitute JPEG image (substitute JPEG image data) for target RAW image

Area information about each partial area

Each RAW histogram (RAW histogram data) generated in step S302

The substitute JPEG image to be transmitted in step S303 is, for example, a JPEG image that is stored in a RAW file together with the target RAW image. The substitute JPEG image may be a JPEG image obtained by converting the target RAW image at the timing of the transmission thereof. The substitute JPEG image may not be a JPEG image obtained by converting the target RAW image. The substitute JPEG image may be a JPEG image generated by other image capturing performed at substantially the same timing as the timing of the capturing of the target RAW image ("substantially" including "perfectly"). The data size (information amount) of the substitute JPEG image is smaller than the data size of the target RAW image.

Figure 4:
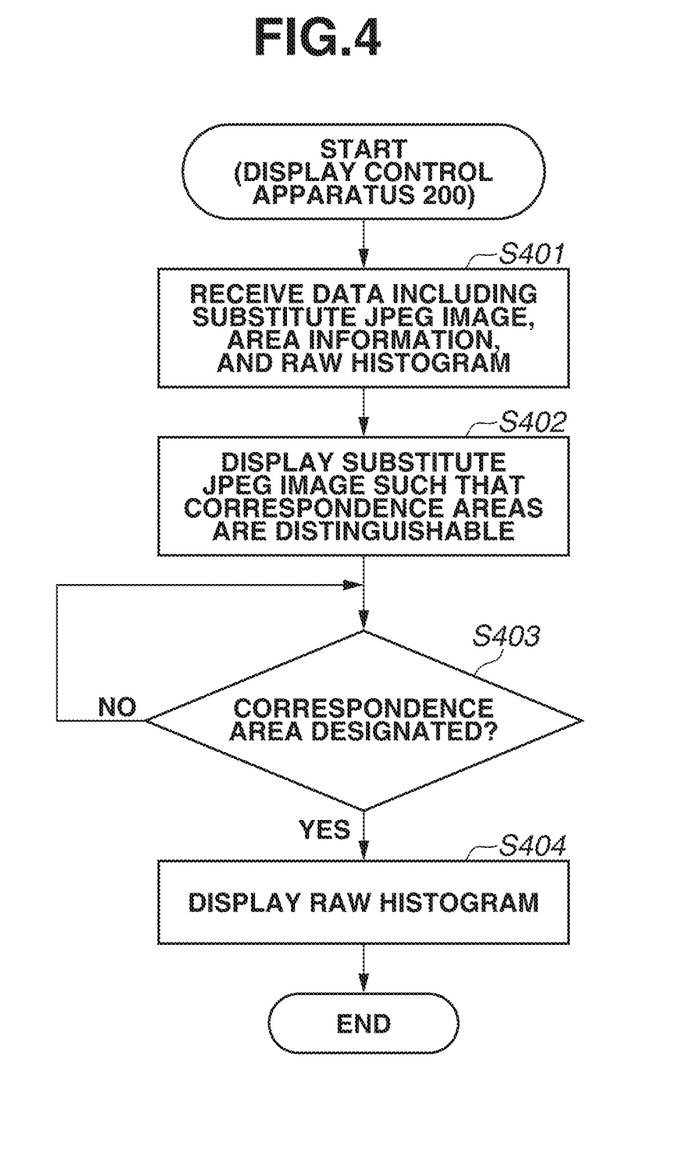
FIG. 4 is a flowchart illustrating an example of a processing flow in the display control apparatus according to the present exemplary embodiment.

FIG. 4 is a flowchart illustrating an example of a processing flow in the display control apparatus 200. The processing flow in FIG. 4 is performed after step S303 in FIG. 3.

In step S401, the control unit 201 detects reception (acquisition) of data by the communication unit 207. This data is the data (the substitute JPEG image, each of the RAW histograms, and the area information) transmitted from the image capturing apparatus 100 in step S303.

In step S402, the control unit 201 performs control for displaying the substitute JPEG image at the display unit 206 such that a plurality of correspondence areas corresponding to the respective plurality of partial areas is distinguishable, based on the substitute JPEG image and the area information received in step S401. The correspondence area is an area forming a part of the substitute JPEG image. The area information may be information indicating the partial area, or information indicating the correspondence area. The area information may be any kind of information if the correspondence area and the partial area corresponding to the correspondence area can be determined using the area information.

Figure 5:
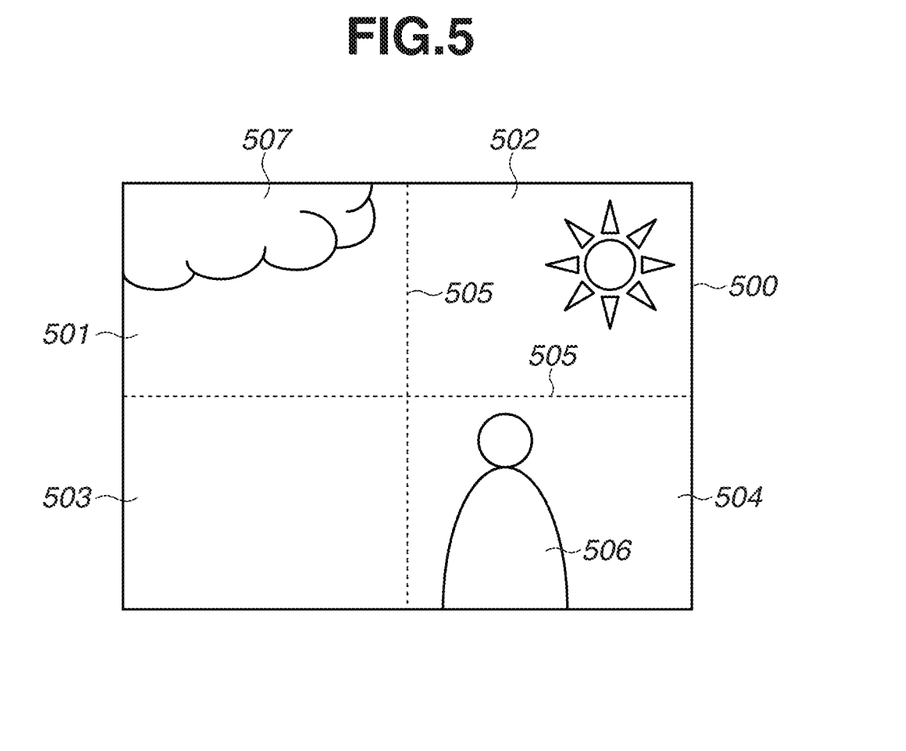
FIG. 5 is a diagram illustrating a display example of a substitute Joint Photographic Experts Group (JPEG) image according to the present exemplary embodiment.

For example, a screen illustrated in FIG. 5 is displayed at the display unit 206 by the process in step S402. Any method may be employed to make the correspondence areas distinguishable. In FIG. 5, four correspondence areas 501 to 504 corresponding to the respective four partial areas can be distinguished by a broken line 505 on a substitute JPEG image 500. The broken line 505 can also be "the boundary of each of four correspondence areas 501 to 504". A person 506 that is a main object and a cloud 507 that is a part of a background appear in the substitute JPEG image 500. Here, assume that whiteout is occurring in a part of the cloud 507.

In step S403, the control unit 201 determines whether the correspondence area is designated by a user. A user operation for designating the correspondence area can be performed, for example, using the operation unit 205. If the control unit 201 determines that the correspondence area is designated (YES in step S403) after having waited for the designation of the correspondence area, the processing proceeds to step S404.

In step S404, the control unit 201 performs control for displaying the RAW histogram of the correspondence area designated in step S403 (specifically, the RAW histogram of the partial area corresponding to the designated correspondence area), at the display unit 206.

Figure 6:
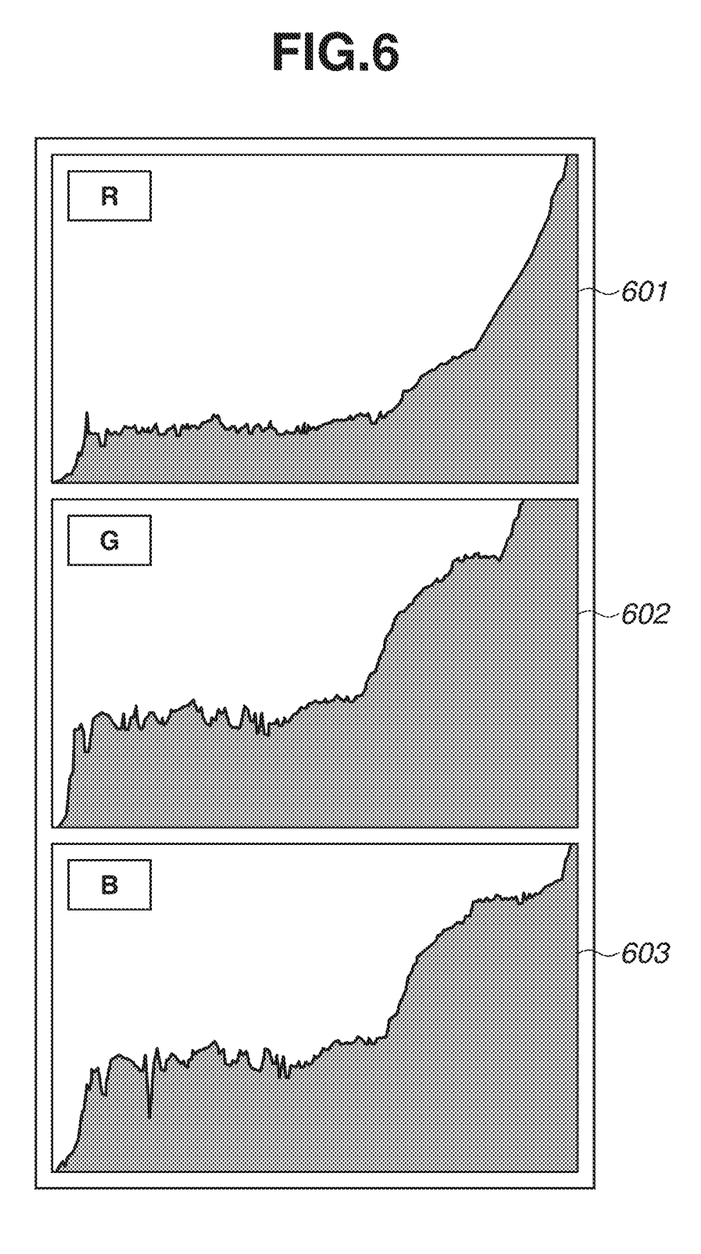
FIG. 6 is a diagram illustrating a display example of a RAW histogram according to the present exemplary embodiment.

For example, a screen illustrated in FIG. 6 is displayed at the display unit 206 by the process in step S404. The screen illustrated in FIG. 6 includes an R-histogram 601 corresponding to red, a G-histogram 602 corresponding to green, and a B-histogram 603 corresponding to blue. The horizontal axis of the R-histogram 601 indicates gradation values corresponding to red, the horizontal axis of the G-histogram 602 indicates gradation values corresponding to green, and the horizontal axis of the B-histogram 603 indicates gradation values corresponding to blue. The vertical axis of each of the R-histogram 601, the G-histogram 602, and the B-histogram 603 indicates a frequency (the number of pixels having the corresponding gradation value).

The user can recognize the gradation of the target RAW image in the partial area corresponding to the correspondence area 501 with high accuracy, by checking the R-histogram 601, the G-histogram 602, and the B-histogram 603. The screen illustrated in FIG. 6 is a screen in a case where the correspondence area 501 illustrated in FIG. 5 is designated. In this case, the frequency reaches an upper limit in a gradation range of gradation values, in all of the R-histogram 601, the G-histogram 602, and the B-histogram 603. Therefore, the user can determine that the whiteout occurring in the cloud 507 of the substitute JPEG image 500 is also present in the RAW image. Similarly, the user can determine whether the whiteout or blackout of the person 506 is occurring in the target RAW image, by designating the target area 504 and checking the RAW histogram of the designated target area 504.

As described above, according to the present exemplary embodiment, not only the substitute JPEG image but also the RAW histogram can be displayed. The user who checks the substitute JPEG image can thereby recognize the gradation of the RAW image with high accuracy. In addition, according to the present exemplary embodiment, the RAW histogram of the partial area is used. Therefore, in a case where a permissible part in which the whiteout and blackout of the RAW image are permissible and a non-permissible part in which the whiteout and blackout of the RAW image are not permissible are present, the RAW histogram of the partial area corresponding to the non-permissible part can be displayed. As a result, the user can determine whether the whiteout or blackout of the RAW image is occurring in the non-permissible part, with high accuracy. Further, according to the present exemplary embodiment, the plurality of RAW histograms corresponding to the respective partial areas can be individually displayed. The user can thereby determine whether the whiteout or blackout of the RAW image is occurring in a plurality of objects, individually. In general, in the display of a JPEG image, a processing load is smaller and processing time is shorter than in the display of a RAW image. According to the present exemplary embodiment, since the JPEG image is displayed in substitution for the RAW image, a reduction in time before starting image display as well as battery saving can be expected.

The present disclosure is described in detail above based on the exemplary embodiment, but the present disclosure is not limited to this specific exemplary embodiment, and various forms in a range not deviating from the subject matter of the present disclosure are also included in the present disclosure.

For example, the first electronic apparatus is not limited to the image capturing apparatus. Any type of apparatus can be used as the first electronic apparatus as long as the apparatus can read out a captured image. For example, an information processing apparatus such as a personal computer that can read out a captured image from a storage medium may be used as the first electronic apparatus.

Any method may be employed to determine the partial area. For example, an area of a predetermined size (a predetermined width and a predetermined height) independent of the RAW image may be determined as the partial area. In this case, as the image size of the RAW image increases, more partial areas are determined as the plurality of partial areas forming the entire area of the RAW image. A number of partial areas independent of the RAW image may be predetermined. In this case, as the image size of the RAW image increases, a larger partial area is determined as each of the partial areas forming the entire area of the RAW image. An area designated by the user may be determined as the partial area. The user may designate the size and the number of partial areas.

The control unit 101 may determine the partial area based on the data format of the RAW image (the RAW image data). For example, in a case where a RAW-image encoding format is a tile format for encoding data for each of tiles forming the entire area of the RAW image, the control unit 101 may determine each of the tiles as the partial area. The tile is thereby encoded to generate the RAW histogram of this tile. Therefore, a reduction in processing load (memory saving) can be expected, as compared with a configuration for generating a RAW histogram by encoding an entire RAW image. Moreover, a reduction in processing time can also be expected, because processes such as decoding, generation of the RAW histogram, and transmission of the RAW histogram can be executed in parallel.

The control unit 101 may determine the partial area, based on information from an external apparatus (a smartphone). For example, this external apparatus outputs information about the partial area, in response to a user operation performed on the external apparatus. Specifically, a user operation is performed to designate at least any one of a partial area, the layout (e.g., two rows and two columns, or three rows and three columns) of a partial area, and the number of partial areas. The external apparatus then outputs information indicating at least any one of the partial area, the layout of the partial area, and the number of partial areas. The control unit 101 determines the partial area, based on the information output from the external apparatus. The external apparatus (specifically, such as an application to be executed in the external apparatus) may automatically generate information based on a situation as the information about the partial area, and output the generated information.

The example in which the plurality of RAW histograms corresponding to the respective partial areas is described, but the exemplary embodiment is not limited to the example. For example, the control unit 201 of the display control apparatus 200 may acquire the RAW histogram for only a part of the plurality of partial areas, in step S401 in FIG. 4. Specifically, the control unit 201 may acquire the RAW histogram for only the partial area where the whiteout or blackout are occurring in the correspondence area. The control unit 201 may acquire the RAW histogram for only the partial area designated by the user. Specifically, the control unit 201 may perform control to send a request for only the RAW histogram of the designated partial area to the image capturing apparatus 100. The image capturing apparatus 100 may transmit only the RAW histogram of the designated partial area to the display control apparatus 200, in response to the request. This also applies to the process (step S302 in FIG. 3) in which the control unit 101 of the image capturing apparatus 100 acquires the RAW histogram. Only the partial area with respect to which the RAW histogram is acquired may be determined in step S301 in FIG. 3.

Any method may be employed to determine the partial area where the whiteout or blackout is occurring in the correspondence area. For example, the control unit 201 can detect the partial area where the whiteout or blackout is occurring in the correspondence area from the plurality of partial areas, based on the substitute JPEG image. Information about the partial area where the whiteout or blackout is occurring in the correspondence area may be acquired from the outside of the display control apparatus 200. Then, the control unit 201 may determine the partial area where the whiteout or blackout is occurring in the correspondence area, using the information acquired from the outside. The control unit 101 of the image capturing apparatus 100 can also determine the partial area where the whiteout or blackout is occurring in the correspondence area, by a similar method. Because the RAW image is present within the image capturing apparatus 100, the control unit 101 can detect the partial area where the whiteout or blackout is occurring in the correspondence area from the plurality of partial areas, based on the RAW image.

Any color element of the RAW histogram may be employed. For example, colors such as cyan, magenta, and yellow may be used for the color element of the RAW histogram. In step S401 in FIG. 4, the control unit 201 of the display control apparatus 200 may acquire the plurality of RAW histograms corresponding to the respective color elements, or may acquire the RAW histogram for only a part of the plurality of color elements. For example, the control unit 201 may acquire only one of the R-histogram 601, the G-histogram 602, and the B-histogram 603 illustrated in FIG. 6. The control unit 201 may acquire only two of the R-histogram 601, the G-histogram 602, and the B-histogram 603. The control unit 201 may acquire a histogram for a luminance value (a Y value) as the RAW histogram, instead of the histogram for the color element. This also applies to the process (step S302 in FIG. 3) in which the control unit 101 of the image capturing apparatus 100 acquires the RAW histogram.

The image capturing apparatus 100 and the display control apparatus 200 may be integrated. In this case, for example, the processes in step S402 to step S404 in FIG. 4 are performed after the processes in step S301 and step S302 in FIG. 3 are performed (the processes in step S303 and step S401 is omitted). In addition, in this configuration, the user can recognize the gradation of the RAW image with high accuracy, by checking the displayed RAW histogram.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-037174, filed Mar. 2, 2018, which is hereby incorporated by reference herein in its entirety.

What is claimed is:

1. An electronic apparatus comprising:
a processor;

a memory storing a program which, when executed by the processor, causes the electronic apparatus to:

divide a first image into a plurality of partial areas;

generate histograms for each of the plurality of partial areas of the first image, the histograms representing a number of pixels of each gradation;

acquire a second image corresponding to the first image and having a data size smaller than a data size of the first image;

output the second image, area information about relation between the plurality of partial areas of the first image and partial areas of the second image, and at least one of the histograms generated for each of the plurality of partial areas of the first image, to outside;

control a display unit to display the second image;

designate one of the partial areas of the second image in response to a user operation; and control the display unit to display a histogram of one of the plurality of partial areas of the first image corresponding to the designated partial area of the second image based on the area information wherein.

2. The electronic apparatus according to claim 1, wherein the program, when executed by the processor, further causes the electronic apparatus to perform image capturing processing to generate the first image.

3. The electronic apparatus according to claim 1, wherein the first image is a RAW image, and the second image is generated by conversion of the RAW image.

4. The electronic apparatus according to claim 1, wherein as the data size of the first image increases, a number of divisions for the partial areas increases.

5. The electronic apparatus according to claim 1, wherein one of the plurality of partial areas of the first image is an area obtained by division of the first image into a plurality of rows and columns.

6. A control method for an electronic apparatus, the control method comprising:

dividing a first image into a plurality of partial areas;

generating histograms for each of the plurality of partial areas of the first image, the histograms representing a number of pixels of each gradation;

acquiring a second image corresponding to the first image and having a data size smaller than a data size of the first image;

output the second image, area information about relation between the plurality of partial areas of the first image and partial areas of the second image, and at least one of the histograms generated for each of the plurality of partial areas of the first image, to outside;

controlling a display unit to display the second image;

designating one of the partial areas of the second image in response to a user operation; and controlling the display unit to display a histogram of one of the plurality of partial areas of the first image corresponding to the designated partial area of the second image based on the area information.

7. A non-transitory computer-readable storage medium storing a program for causing a computer to execute a control method for an electronic apparatus, the control method comprising:

dividing a first image into a plurality of partial areas;

generating histograms for each of the plurality of partial areas of the first image, the histograms representing a number of pixels of each gradation;

acquiring a second image corresponding to the first image and having a data size smaller than a data size of the first image;

output the second image, area information about relation between the plurality of partial areas of the first image and partial areas of the second image, and at least one of the histograms generated for each of the plurality of partial areas of the first image, to outside;

controlling a display unit to display the second image;

designating one of the partial areas of the second image in response to a user operation; and controlling the display unit to display a histogram of one of the plurality of partial areas of the first image corresponding to the designated partial area of the second image based on the area information.

* * * * *